(12) United States Patent
Schwarz et al.

(10) Patent No.: US 11,225,913 B2
(45) Date of Patent: Jan. 18, 2022

(54) METHOD OF PROVIDING TURBINE ENGINES WITH DIFFERENT THRUST RATINGS

(71) Applicant: United Technologies Corporation, Farmington, CT (US)

(72) Inventors: Frederick M. Schwarz, Glastonbury, CT (US); William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 264 days.

(21) Appl. No.: 16/186,795

(22) Filed: Nov. 12, 2018

(65) Prior Publication Data
US 2019/0085771 A1    Mar. 21, 2019

Related U.S. Application Data

(63) Continuation-in-part of application No. 14/626,534, filed on Feb. 19, 2015, now abandoned.

(51) Int. Cl.
*F02C 7/36* (2006.01)
*B23P 6/00* (2006.01)
(Continued)

(52) U.S. Cl.
CPC ................ *F02C 7/36* (2013.01); *F02C 3/107* (2013.01); *F02K 1/66* (2013.01); *F02K 3/06* (2013.01);
(Continued)

(58) Field of Classification Search
CPC .... F02C 7/36; F02C 3/107; F02K 1/66; F02K 3/06; F05D 2260/74; F05D 2230/51;
(Continued)

(56) References Cited

U.S. PATENT DOCUMENTS 3,729,957 A    5/1973 Petrie et al.
3,820,719 A    6/1974 Clark et al.
(Continued)

FOREIGN PATENT DOCUMENTS

| EP | 2177735 A2 | 4/2010 |
|---|---|---|
| GB | 1319849 A | 6/1973 |
| WO | 2015031143 A1 | 3/2015 |

OTHER PUBLICATIONS

Search report for EP19208138.8 dated Apr. 3, 2020.
(Continued)

*Primary Examiner* — Sarang Afzali
(74) *Attorney, Agent, or Firm* — Getz Balich LLC

(57) ABSTRACT

A method is provided that includes providing a first turbine engine and providing a second turbine engine. The first turbine engine is configured with a first thrust rating. The first turbine engine includes a first engine rotating assembly and a first engine case structure housing at least the first engine rotating assembly. The second turbine engine is configured with a second thrust rating that is different than the first thrust rating. The second turbine engine includes a second engine rotating assembly and a second engine case structure housing at least the second engine rotating assembly. The first engine case structure and the second engine case structure have at least substantially common configurations. The first turbine engine and the second turbine engine are provided by a common entity.

10 Claims, 11 Drawing Sheets

(51) Int. Cl.
*F02C 3/107* (2006.01)
*F02K 3/06* (2006.01)
*F02K 1/66* (2006.01)

(52) U.S. Cl.
CPC ............ *B23P 6/00* (2013.01); *F05D 2220/36* (2013.01); *F05D 2230/51* (2013.01); *F05D 2230/52* (2013.01); *F05D 2230/80* (2013.01); *F05D 2260/40311* (2013.01); *F05D 2260/74* (2013.01)

(58) Field of Classification Search
CPC ....... F05D 2230/52; F05D 2260/40311; F05D 2220/36; F05D 2230/80
See application file for complete search history.

(56) References Cited

U.S. PATENT DOCUMENTS

| | | | |
|---|---|---|---|
| 4,043,522 A * | 8/1977 | Vetter | B64D 29/00 244/54 |
| 4,371,132 A | 2/1983 | Woodward | |
| 4,968,217 A | 11/1990 | Newton | |
| 5,118,256 A | 6/1992 | Violette et al. | |
| 5,261,227 A * | 11/1993 | Giffin, III | F02K 3/077 60/226.1 |
| 5,282,719 A | 2/1994 | McCarty et al. | |
| 5,431,539 A | 7/1995 | Carvalho | |
| 6,041,589 A | 3/2000 | Giffin, III | |
| 6,921,046 B2 * | 7/2005 | Bacon | B64C 15/00 244/52 |
| 7,100,360 B2 | 9/2006 | Sammann et al. | |
| 8,352,099 B1 * | 1/2013 | Eggold | B64D 31/06 701/4 |
| 8,607,576 B1 | 12/2013 | Christians | |
| 8,770,927 B2 | 7/2014 | Strock et al. | |
| 8,820,088 B2 | 9/2014 | Gilson et al. | |
| 8,869,504 B1 | 10/2014 | Schwarz et al. | |
| 8,887,487 B2 | 11/2014 | Kupratis et al. | |
| 8,900,090 B2 | 12/2014 | Sheridan | |
| 8,935,912 B2 | 1/2015 | Norris et al. | |
| 9,242,316 B2 * | 1/2016 | Blatchford | F01D 5/005 |
| 2004/0113021 A1 * | 6/2004 | Jones | G05B 13/024 244/195 |
| 2007/0087892 A1 | 4/2007 | Orlando et al. | |
| 2008/0098713 A1 | 5/2008 | Orlando et al. | |
| 2008/0098717 A1 * | 5/2008 | Orlando | F01D 1/24 60/226.1 |
| 2013/0000314 A1 | 1/2013 | McCaffrey | |
| 2013/0186058 A1 | 7/2013 | Sheridan et al. | |
| 2013/0192258 A1 | 8/2013 | Kupratis et al. | |
| 2013/0223974 A1 * | 8/2013 | Schwarz | F02C 9/22 415/1 |
| 2013/0223986 A1 | 8/2013 | Kupratis et al. | |
| 2013/0223992 A1 | 8/2013 | Suciu et al. | |
| 2013/0259652 A1 | 10/2013 | Kupratis et al. | |
| 2013/0283819 A1 | 10/2013 | Schwarz et al. | |
| 2014/0250860 A1 | 9/2014 | Sidelkovskiy | |
| 2014/0260180 A1 | 9/2014 | Kupratis et al. | |
| 2016/0047304 A1 | 2/2016 | Schwarz et al. | |
| 2016/0245184 A1 | 8/2016 | Schwarz | |
| 2018/0223684 A1 | 8/2018 | Jason | |

OTHER PUBLICATIONS

LEAP the Power of the Future Brochure, CFM The Power of Flight, www.cfmaerogines.com, 2013.
EPO Official Letter dated Oct. 19, 2018 for EP Application No. 16156559.3.
Kandebo, "Building Momentum EPI is Looking Ahead to Widen Its Engine Offerings and Expand its Markets", Aviation Week and Space Technology, vol. 158, No. 25, Jun. 23, 2003, pp. 26-27.
Office action for EP16156559.3 dated May 29, 2020.

* cited by examiner

METHOD OF PROVIDING TURBINE ENGINES WITH DIFFERENT THRUST RATINGS

CROSS-REFERENCE TO RELATED APPLICATIONS

This application claims priority to and is a continuation-in-part of U.S. patent application Ser. No. 14/626,534 filed Feb. 19, 2015, which is hereby incorporated herein by reference in its entirety.

BACKGROUND OF THE INVENTION

1. Technical Field

This disclosure relates generally to providing turbine engines with different thrust ratings.

2. Background Information

Various types of turbine engines for propelling an aircraft are known in the art. One exemplary turbine engine type is a geared turbofan turbine engine. A typical geared turbofan turbine engine includes a gear train, a fan rotor and a core. Typically, the core consists essentially of a low speed spool and a high speed spool. The gear train connects the fan rotor to the low speed spool and enables the low speed spool to drive the fan rotor at a slower rotational velocity than that of the low speed spool. Another example of a geared turbofan turbine engine is disclosed in U.S. Pat. No. 8,869,504 to Schwarz et al., which is hereby incorporated herein by reference in its entirety. While such turbine engines have various advantages, there is still a need in the art for improvement.

SUMMARY OF THE DISCLOSURE

According to an aspect of the present disclosure, a turbine engine is provided that includes a fan rotor, a first compressor rotor, a second compressor rotor, a third compressor rotor, a first turbine rotor, a second turbine rotor, a third turbine rotor and a gear train. The fan rotor and the first compressor rotor are connected to the first turbine rotor through the gear train. The second compressor rotor is connected to the second turbine rotor. The third compressor rotor is connected to the third turbine rotor.

According to another aspect of the present disclosure, another turbine engine is provided that includes a first rotating assembly, a second rotating assembly and a third rotating assembly. The first rotating assembly includes a fan rotor, a first compressor rotor, a first turbine rotor and a gear train. The second rotating assembly includes a second compressor rotor and a second turbine rotor. The third rotating assembly includes a third compressor rotor and a third turbine rotor.

According to another aspect of the present disclosure, a method for manufacturing is provided. This method includes steps of manufacturing a first turbine engine configured for a first thrust rating and manufacturing a second turbine engine configured for a second thrust rating which is different than the first thrust rating. The first turbine engine includes a rotating assembly and a first multi-spool core, where the rotating assembly includes a fan rotor, a compressor rotor, a turbine rotor and a gear train. The second turbine engine includes a second multi-spool core. An upstream-most set of compressor blades of the first multi-spool core defines a first area. An upstream-most set of compressor blades of the second multi-spool core defines a second area that is within plus/minus twenty percent of the first area. The first and the second turbine engines are manufactured by and/or for a common entity.

According to another aspect of the present disclosure, another method is provided that includes steps of providing a first turbine engine and providing a second turbine engine. The first turbine engine is configured with a first thrust rating. The first turbine engine includes a first engine rotating assembly and a first engine case structure housing at least the first engine rotating assembly. The second turbine engine is configured with a second thrust rating that is different than the first thrust rating. The second turbine engine includes a second engine rotating assembly and a second engine case structure housing at least the second engine rotating assembly. The first engine case structure and the second engine case structure have at least substantially common configurations. The first turbine engine and the second turbine engine are provided by a common entity.

According to another aspect of the present disclosure, another method is provided that includes steps of providing a first turbine engine and providing a second turbine engine. The first turbine engine includes a first engine component, a first engine rotating assembly and a first engine case structure housing at least the first engine rotating assembly. The second turbine engine includes a second engine component, a second engine rotating assembly and a second engine case structure housing at least the second engine rotating assembly. The first engine component and the second engine component have different configurations. The first engine case structure and the second engine case structure have at least substantially common configurations. The first turbine engine and the second turbine engine are provided by a common entity.

According to still another aspect of the present disclosure, another method for manufacturing is provided that includes steps of providing a first turbine engine and providing a second turbine engine. The first turbine engine is configured for a first thrust rating. The first turbine engine includes a rotating assembly and a first core. The rotating assembly includes a fan rotor, a compressor rotor, a turbine rotor and a gear train. The second turbine engine is configured for a second thrust rating which is different than the first thrust rating. The second turbine engine includes a multi-spool second core. An upstream-most set of compressor blades of the first core defines a first area. An upstream-most set of compressor blades of the second core defines a second area that is within plus/minus twenty percent of the first area. The first turbine engine and the second turbine engine are provided by or for a common entity.

The providing of the first turbine engine may include assembling the first turbine engine. The providing of the second turbine engine may include assembling the second turbine engine.

The first engine case structure and the second engine case structure may have identical geometries.

The first engine case structure and the second engine case structure may have identical dimensions.

The first engine rotating assembly may include a first engine compressor rotor and a first engine turbine rotor. The second engine rotating assembly may include a second engine compressor rotor and a second engine turbine rotor.

The first turbine engine may further include an additional first engine rotating assembly housed by the first engine case structure. The second turbine engine may further include an additional second engine rotating assembly housed by the second engine case structure.

The first engine rotating assembly and the additional first engine rotating assembly may each include a compressor rotor, a turbine rotor and a shaft connecting the compressor rotor to the turbine rotor.

The first turbine engine may also include a first engine rotor upstream of the first engine case structure. The second turbine engine may also include a second engine rotor upstream of the second engine case structure. A configuration of the first engine rotor may be different than a configuration of the second engine rotor.

The first engine rotor and the second engine rotor may each be configured as a compressor rotor.

The first engine rotor and the second engine rotor may each be configured as a fan rotor.

The first turbine engine and the second turbine engine may each be configured as a direct drive turbine engine.

The first turbine engine and the second turbine engine may each be configured as a geared turbine engine.

The first turbine engine may be configured as a direct drive turbine engine. The second turbine engine may be configured as a geared turbine engine.

The first turbine engine may (e.g., only) include a first number of rotor disks. The second turbine engine may (e.g., only) include a second number of rotor disks that is different than the first number of rotor disks.

The first engine rotating assembly may include a first engine rotor disk. The second engine rotating assembly may include a second engine rotor disk. The first engine rotor disk and the second engine rotor disk may have at least substantially common configurations.

The first engine rotating assembly may include a first engine shaft. The second engine rotating assembly may include a second engine shaft. The first engine shaft and the second engine shaft may have at least substantially common configurations.

The first engine rotating assembly may include a first engine combustor. The second engine rotating assembly may include a second engine combustor. The first engine combustor and the second engine combustor may have at least substantially common configurations.

A first shaft may be included and connect the gear train to the first turbine rotor. A second shaft may be included and connect the second compressor rotor to the second turbine rotor. A third shaft may be included and connect the third compressor rotor to the third turbine rotor.

The second shaft may extend through the third shaft. The first shaft may extend through the second shaft.

The first compressor rotor may be connected to the gear train through the fan rotor.

The first compressor rotor may be connected to the gear train independent of the fan rotor.

The first compressor rotor may include a first set of compressor blades and a second set of compressor blades downstream of the first set of compressor blades.

The fan rotor may include one or more variable pitch fan blades.

The variable pitch fan blades may be configured to move between a first position and a second position. The fan rotor may be operable to provide forward thrust where the variable pitch fan blades are in the first position. The fan rotor may be operable to provide reverse thrust where the variable pitch fan blades are in the second position.

A nacelle may be included housing the fan rotor. The nacelle may include a translating sleeve configured to open a passageway through the nacelle where the variable pitch fan blades are in the second position. The translating sleeve may be configured to close the passageway where the variable pitch fan blades are in the first position.

A leading edge of a first of the variable pitch fan blades may move in a forward direction as that blade moves from the first position to the second position.

The gear train may connect the fan rotor and the first compressor rotor to the first turbine rotor.

The first compressor rotor may be connected to the gear train through the fan rotor.

The fan rotor and the first compressor rotor may be connected to the gear train in parallel.

The gear train may connect the fan rotor to a shaft. The shaft may connect the gear train and the first compressor rotor to the first turbine rotor.

The first compressor rotor may consist essentially of (only include) a rotor disk and a set of compressor blades arranged around and connected to the rotor disk.

The first compressor rotor may include a rotor disk, a first set of compressor blades and a second set of compressor blades. The first set of compressor blades may be arranged around and connected to the rotor disk. The second set of compressor blades may be arranged around and connected to the rotor disk downstream of the first set of compressor blades.

More than fifty percent of components included in the first turbine engine may be configured substantially similar to corresponding components in the second turbine engine.

The foregoing features and the operation of the invention will become more apparent in light of the following description and the accompanying drawings.

DETAILED DESCRIPTION OF THE INVENTION

Figure 1:
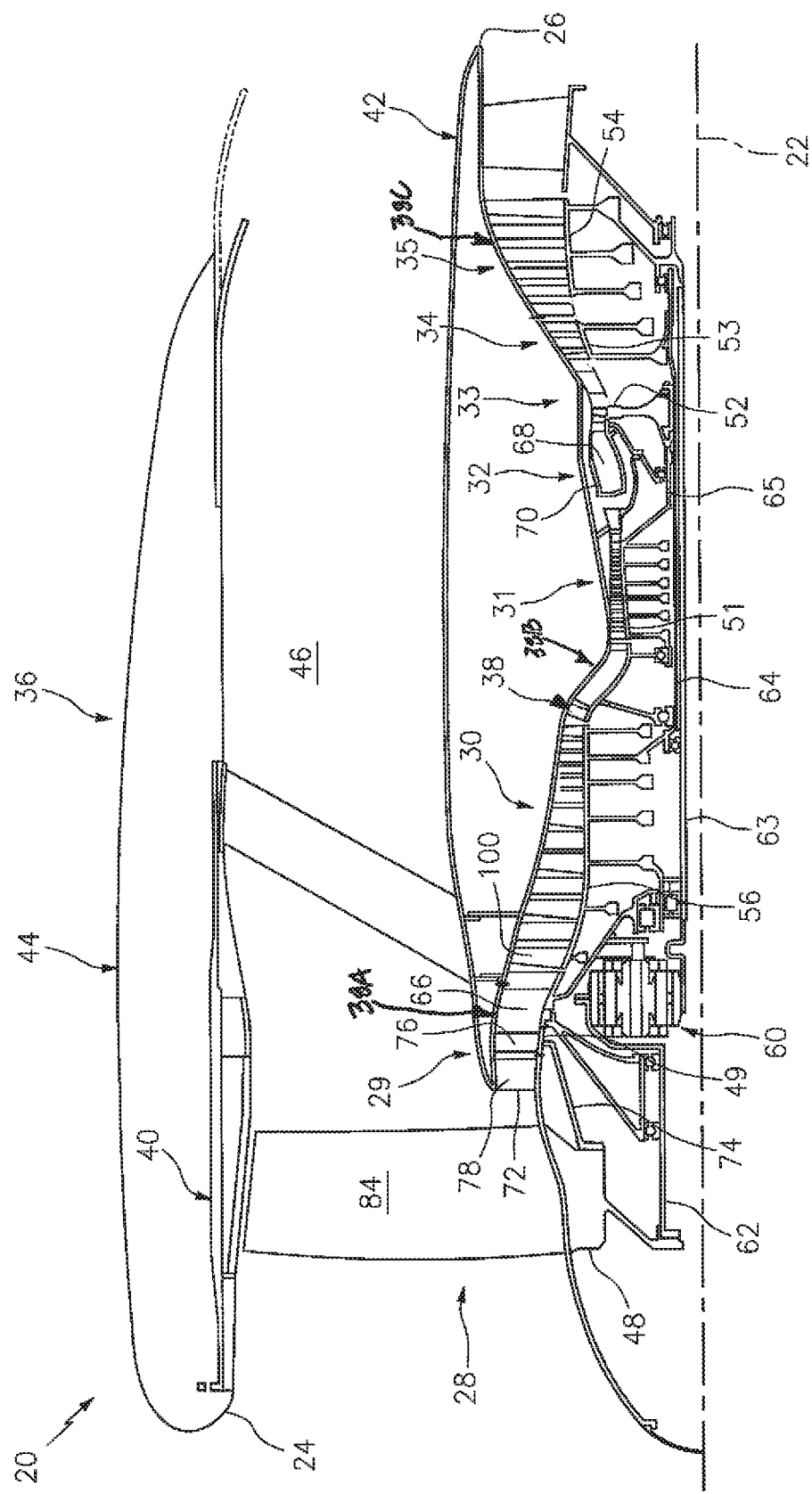
FIG. 1 is a partial sectional illustration of an example geared turbofan turbine engine.

FIG. 1 is a partial sectional illustration of a geared turbofan turbine engine 20. The turbine engine 20 extends along an axial centerline 22 between an upstream airflow inlet 24 and a downstream airflow exhaust 26. The turbine engine 20 includes a fan section 28, a compressor section, a combustor section 32 and a turbine section. The compressor section includes a low pressure compressor (LPC) section 29 (e.g., an inducer section), an intermediate pressure compressor (IPC) section 30 and a high pressure compressor (HPC) section 31. The turbine section includes a high pressure turbine (HPT) section 33, an intermediate pressure turbine (IPT) section 34 and a low pressure turbine (LPT) section 35.

The engine sections 28-35 are arranged sequentially along the centerline 22 within an engine housing 36. This housing 36 includes an inner (e.g., core) casing 38 and an outer (e.g., fan) casing 40.

The inner casing 38 houses the engine sections 29-35, which sections 30-34 form a multi-spool core of the turbine engine 20. The inner casing 38 includes one or more axial casing segments. The inner casing 38 of FIG. 1, for example, includes an axial first (e.g., forward) case structure 38A, an axial second (e.g., intermediate) case structure 38B and an axial third (e.g., aft) case structure 38C. The first case structure 38A houses at least the LPC section 29. The second case structure 38B houses at least the engine sections 30-34 and, thus, the various components thereof as well as the shafts 64 and 65. The third case structure 38C houses at least the LPT section 35. An aft end of the first case structure 38A may be attached to a forward end of the second case structure 38B via, for example, a bolted flange connection. An aft end of the second case structure 38B may be attached to a forward end of the third case structure 38C via, for example, a bolted flange connection. Each of the foregoing case structures may be configured from a single tubular body (e.g., axial casing segment), or from a plurality of interconnected tubular bodies (e.g., axial casing segments).

The outer casing 40 houses at least the fan section 28.

The engine housing 36 also includes an inner (e.g., core) nacelle 42 and an outer (e.g., fan) nacelle 44. The inner nacelle 42 houses and provides an aerodynamic cover for the inner casing 38. The outer nacelle 44 houses and provides an aerodynamic cover the outer casing 40. The outer nacelle 44 also overlaps a portion of the inner nacelle 42 thereby defining a bypass gas path 46 radially between the nacelles 42 and 44. The bypass gas path 46, of course, may also be partially defined by the outer casing 40 and/or other components of the turbine engine 20.

Each of the engine sections 28-31 and 33-35 includes a respective rotor 48-54. Each of these rotors 48-54 includes a plurality of rotor blades (e.g., fan blades, compressor blades or turbine blades) arranged circumferentially around and connected to one or more respective rotor disks. The rotor blades, for example, may be formed integral with or mechanically fastened, welded, brazed, adhered and/or otherwise attached to the respective rotor disk(s).

Figure 2:
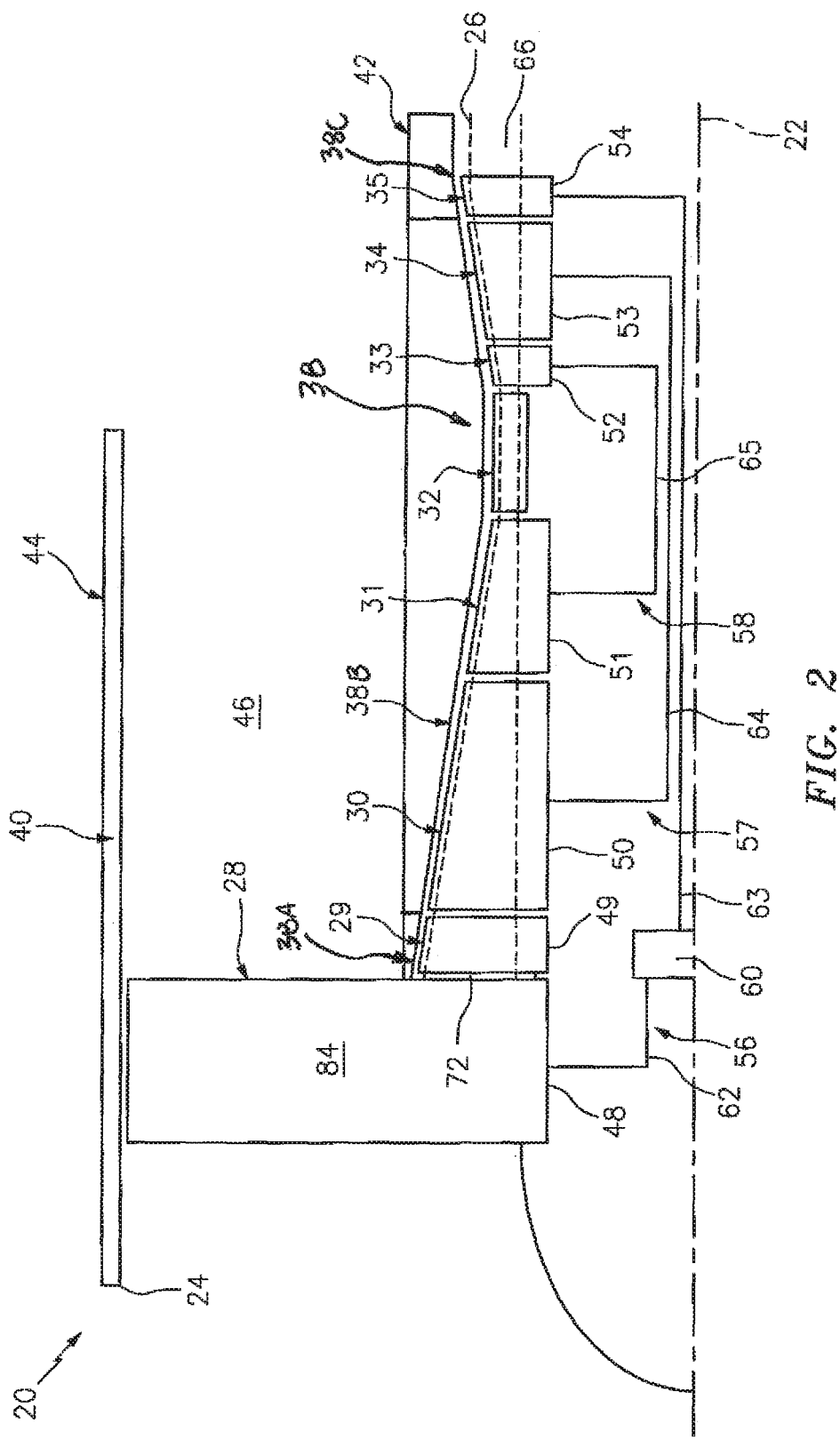
FIG. 2 is a partial schematic illustration of the turbine engine of FIG. 1.

Referring to FIG. 2, the rotors 48-54 are respectively configured into a plurality of rotating assemblies 56-58. The first rotating assembly 56 includes the fan rotor 48, the LPC rotor 49 and the LPT rotor 54. The first rotating assembly 56 also includes a gear train 60 and one or more shafts 62 and 63, which gear train 60 may be configured as an epicyclic gear train with a planetary or star gear system. The LPC rotor 49 is connected to the fan rotor 48 via, for example, a bolted flange connection. The fan rotor 48 is connected to the gear train 60 through the fan shaft 62. The LPC rotor 49 is therefore connected to the gear train 60 through the fan rotor 48 and the fan shaft 62. The gear train 60 is connected to and driven by the LPT rotor 54 through the low speed shaft 63.

The second rotating assembly 57 includes the IPC rotor 50 and the IPT rotor 53. The second rotating assembly 57 also includes an intermediate speed shaft 64. The IPC rotor 50 is connected to and driven by the IPT rotor 53 through the intermediate speed shaft 64.

The third rotating assembly 58 includes the HPC rotor 51 and the HPT rotor 52. The third rotating assembly 58 also includes a high speed shaft 65. The HPC rotor 51 is connected to and driven by the HPT rotor 52 through the high speed shaft 65.

Referring to FIG. 1, one or more of the shafts 62-65 may be coaxial about the centerline 22. One or more of the shafts 63-65 may also be concentrically arranged. The low speed shaft 63 is disposed radially within and extends axially through the intermediate speed shaft 64. The intermediate speed shaft 64 is disposed radially within and extends axially through the high speed shaft 65. The shafts 62-65 are rotatably supported by a plurality of bearings; e.g., rolling element and/or thrust bearings. Each of these bearings is connected to the engine housing 36 (e.g., the inner casing 38) by at least one stationary structure such as, for example, an annular support strut.

During operation, air enters the turbine engine 20 through the airflow inlet 24. This air is directed through the fan section 28 and into a core gas path 66 and the bypass gas path 46. The core gas path 66 flows sequentially through the engine sections 29-35. The air within the core gas path 66 may be referred to as "core air". The air within the bypass gas path 46 may be referred to as "bypass air".

The core air is compressed by the compressor rotors 49-51 and directed into a combustion chamber 68 of a combustor 70 in the combustor section 32. Fuel is injected into the combustion chamber 68 and mixed with the compressed core air to provide a fuel-air mixture. This fuel air mixture is ignited and combustion products thereof flow through and sequentially cause the turbine rotors 52-54 to rotate. The rotation of the turbine rotors 52-54 respectively drive rotation of the compressor rotors 51-49 and, thus, compression of the air received from a core airflow inlet 72. The rotation of the turbine rotor 54 also drives rotation of the fan rotor 48, which propels bypass air through and out of the bypass gas path 46. The propulsion of the bypass air may account for a majority of thrust generated by the turbine engine 20, e.g., more than seventy-five percent (75%) of engine thrust. The turbine engine 20 of the present disclosure, however, is not limited to the foregoing exemplary thrust ratio.

The exemplary LPC rotor 49 of FIG. 1 includes a rotor disk 74 and one set of compressor blades 76. These compressor blades 76 are arranged around and connected to the rotor disk 74 as described above. The compressor blades 76 are adjacent to and downstream of a set of stator vanes 78. These stator vanes 78 may be positioned generally at the inlet 72 to the core gas path 66. In other embodiments, however, the stator vanes 78 may be positioned downstream of the compressor blades 76. In still other embodiments, an additional set of stator vanes may be positioned downstream and adjacent the compressor blades 76.

Figure 3:
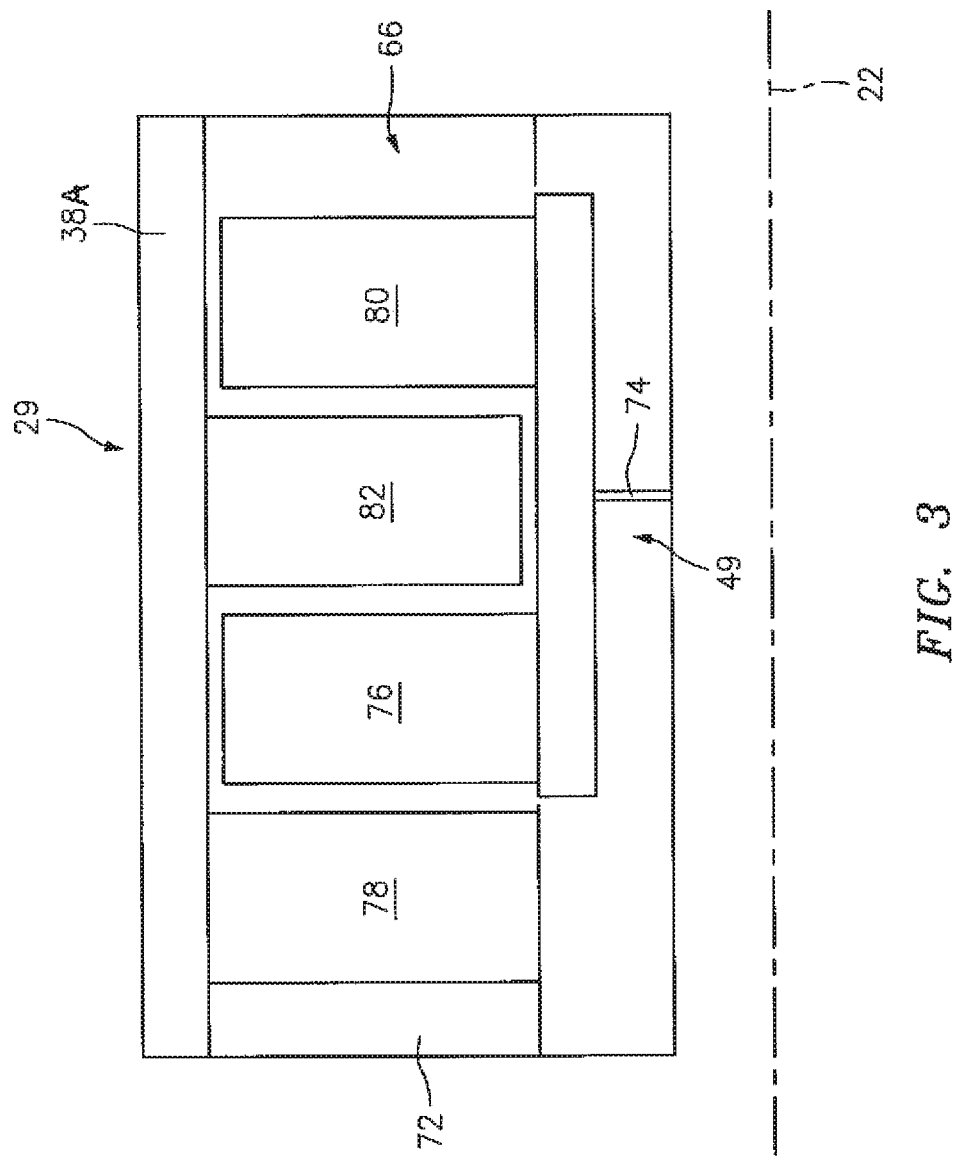
FIG. 3 is a partial schematic illustration of an example of a low pressure compressor section.

While the LPC rotor 49 is described above as including a single set of compressor blades 76, the turbine engine 20 of the present disclosure is not limited to such a configuration. For example, referring to FIG. 3, the LPC rotor 49 may alternatively include two sets of compressor blades 76 and 80 disposed at different axial locations along the rotor disk 74. The first set of compressor blades 76, for example, is positioned adjacent and downstream of the stator vanes 78. The second set of compressor blades 80 is positioned downstream of the first set of compressor blades 76. The two sets of compressors blades 76 and 80 may be separated by another set of stator vanes 82 so as to provide the LPC section 29 with two stages. Of course, in other embodiments, the LPC rotor 49 may include more than two sets of compressor blades and provide the LPC section 29 with more than two stages.

Figure 4:
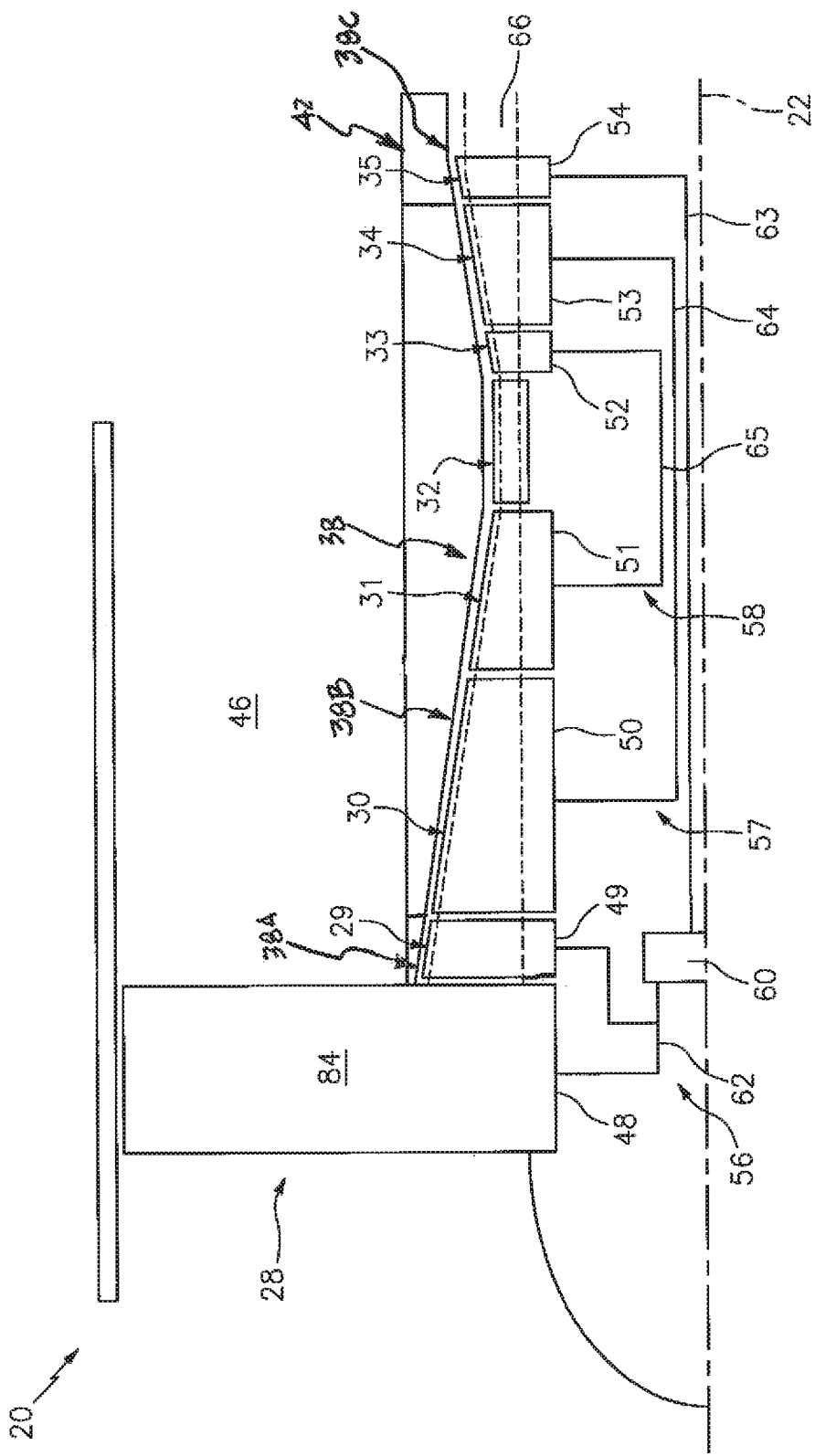
FIG. 4 is a partial schematic illustration of another example geared turbofan turbine engine.

Referring to FIG. 4, in some embodiments, the LPC rotor 49 may be connected to the fan shaft 62 and the gear train 60 independent of the fan rotor 48. The LPC rotor 49 and the fan rotor 48, for example, may be connected to the fan shaft 62 and, thus, the gear train 60 in parallel. More particularly, the LPC rotor 49 and the fan rotor 48 may each be connected to the fan shaft 62 through, for example, a discrete respective spline connection or a bolted flange connection.

Figure 5:
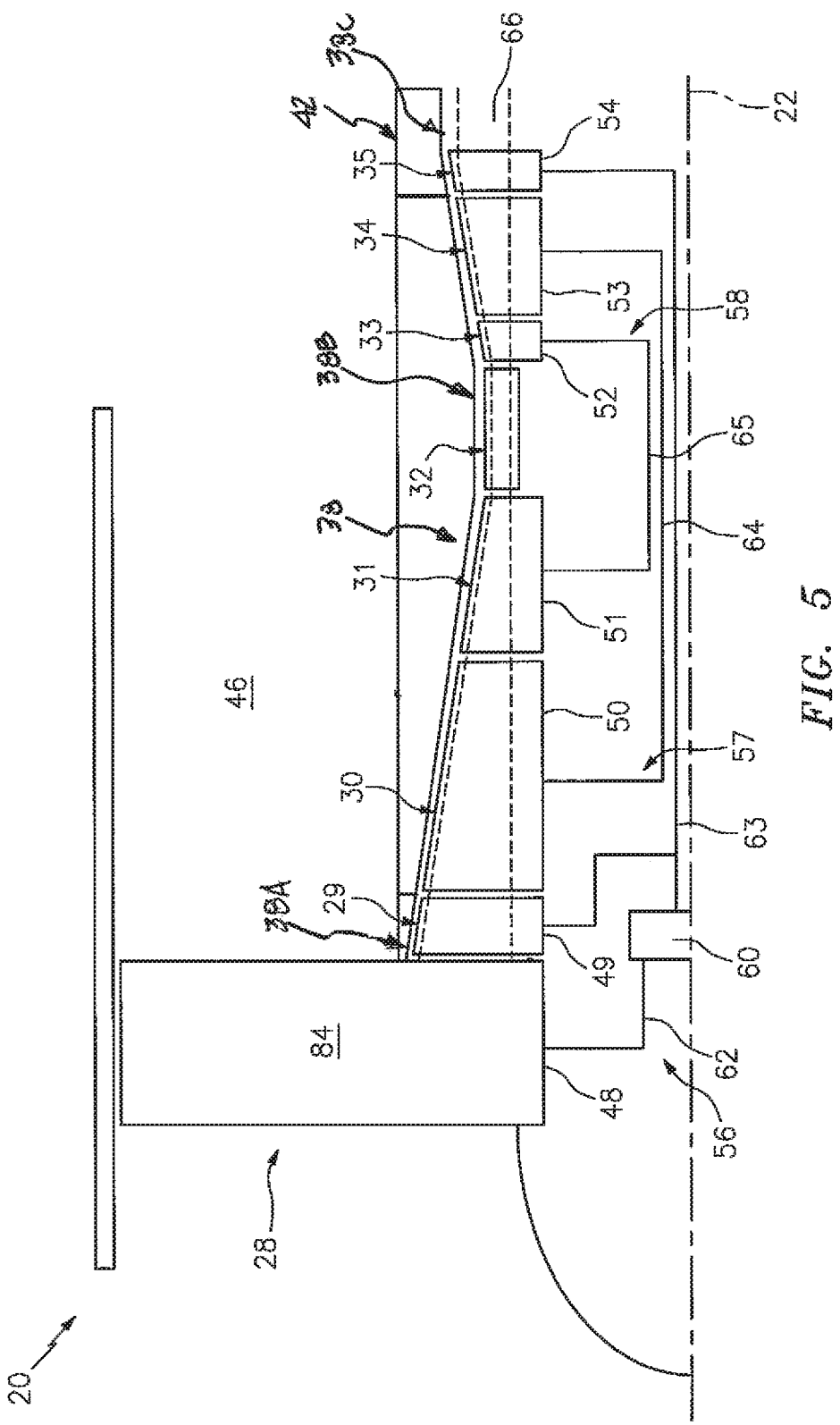
FIG. 5 is a partial schematic illustration of another example geared turbofan turbine engine.

Referring to FIG. 5, in some embodiments, the LPC rotor 49 may be connected directly to the low speed shaft 63 and, thus, independent of the gear train 60. With this configuration, the LPC rotor 49 and the LPT rotor 54 rotate at the same rotational velocity. In contrast, the LPC rotor 49 of FIGS. 1, 2 and 4 rotates at a slower rotational velocity than the LPT rotor 54 due to reduction gearing of the gear train 60.

In some embodiments, the fan blades 84 may be configured as fixed blades and fixedly connected to the fan rotor 48 as illustrated in FIG. 5. In other embodiments, referring to FIG. 6, one or more of the fan blades 84 may be configured as variable pitch fan blades and pivotally connected to a hub of the fan rotor 48. With this configuration, a pitch of each respective fan blade 84 may be changed using an actuation system 86 within the hub of the fan rotor 48. This actuation system 86 may be configured for limited variable pitch. Alternatively, the actuation system 86 may be configured for full variable pitch where, for example, fan blade pitch may be partially or completely reversed.

Figure 6:
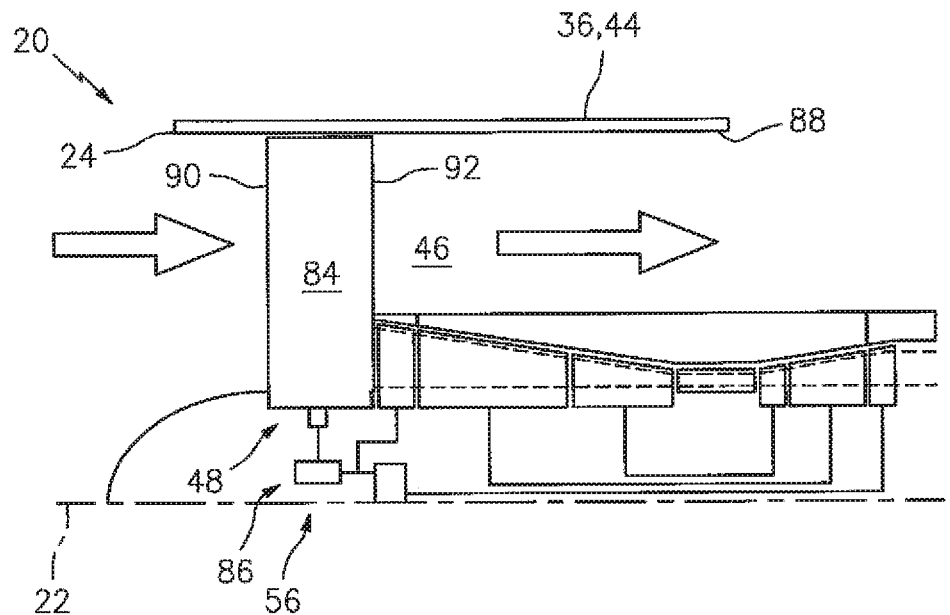
FIG. 6 is a partial schematic illustration of another example geared turbofan turbine engine providing forward thrust.
Figure 7:
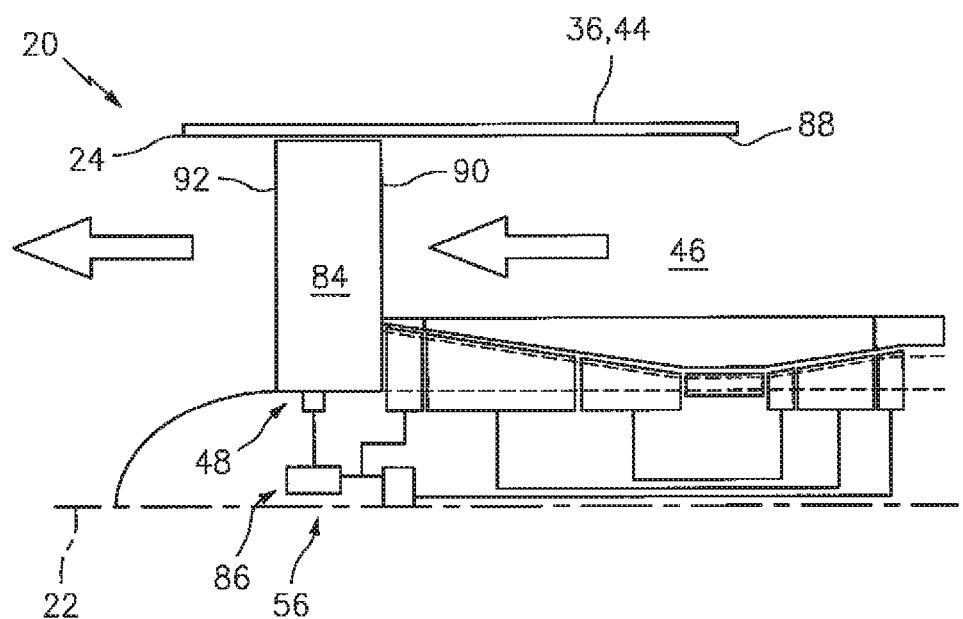
FIG. 7 is a partial schematic illustration of the turbine engine of FIG. 6 providing reverse thrust.

By reversing fan blade pitch, the fan blades 84 may be moved between a first (e.g., forward thrust) position as shown in FIG. 6 and a second (e.g., reverse thrust) position as shown in FIG. 7. In the first position of FIG. 6, the fan blades 84 and the fan rotor 48 may be operable to provide forward thrust; e.g., push air through an exhaust 88 of the bypass gas path 46 as described above. Leading edges 90 of the fan blades 84, for example, may be axially forward of trailing edges 92 of the fan blades 84. In the second position of FIG. 7, the fan blades 84 and the fan rotor 48 may be operable to provide reverse thrust; e.g., push air through the airflow inlet 24. The leading edges 90 of the fan blades 84, for example, may be axially aft of the trailing edges 92 of the fan blades 84. With such a configuration, the turbine engine 20 may be configured without a traditional thrust reverser in the outer nacelle 44.

Figure 8:
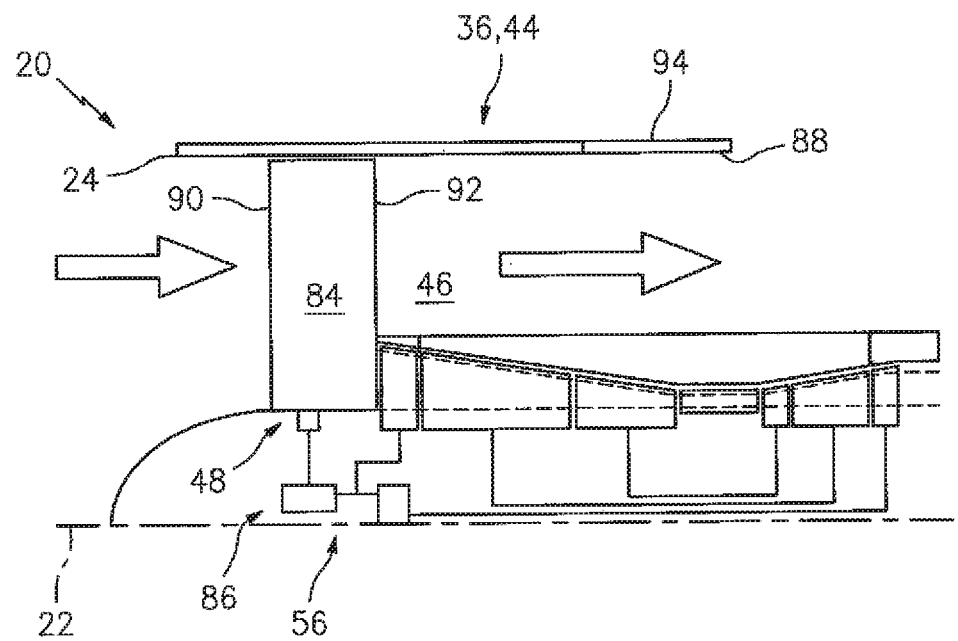
FIG. 8 is a partial schematic illustration of another example geared turbofan turbine engine providing forward thrust.
Figure 9:
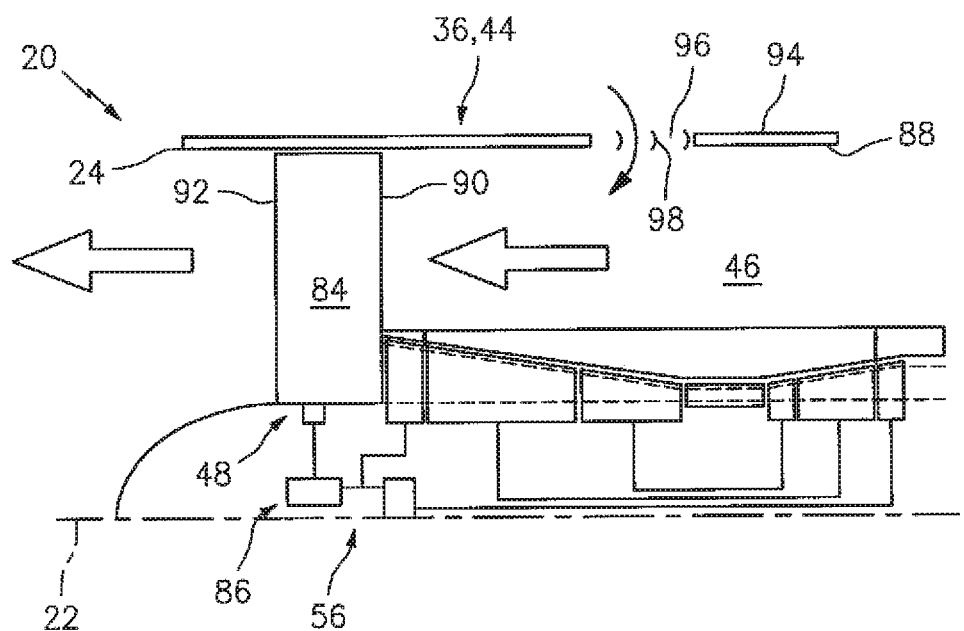
FIG. 9 is a partial schematic illustration of the turbine engine of FIG. 8 providing reverse thrust.

When providing reverse thrust, air may flow into the bypass gas path 46 through the exhaust 88 as shown in FIG. 7. Alternatively, the outer nacelle 44 may include an aft translating sleeve 94 as shown in FIGS. 8 and 9. When the fan blades 84 are in the second position (see FIG. 9) for providing reverse thrust, the sleeve 94 may be translated aft so as to open a passageway 96 through the outer nacelle 44. This passageway 96 may include one or more turning scoops 98 so as to assist in redirecting air into the bypass gas path 46. These turning scoops 98 may be in the form of stationary turning vanes and/or radially deployable turning vanes. However, when the fan blades 84 are in the first position (see FIG. 8) for providing forward thrust, the sleeve 94 may be translated forward so as to close the passageway 96 and stow the turning scoops 98.

As the fan blades 84 move from the first position to the second position, the leading edges 90 may turn in a forward direction. Here the forward direction is "forward" relative to rotation of the fan rotor 48. For example, if the fan rotor 48 is turning in a clockwise direction, the leading edge 90 of each respective fan blade 84 may start moving in a clockwise direction before it reverses pitch and moves in a counter-clockwise direction. However, in other embodiments, as the fan blades 84 move from the first position to the second position, the leading edges 90 may turn in a reverse direction.

Figure 10:
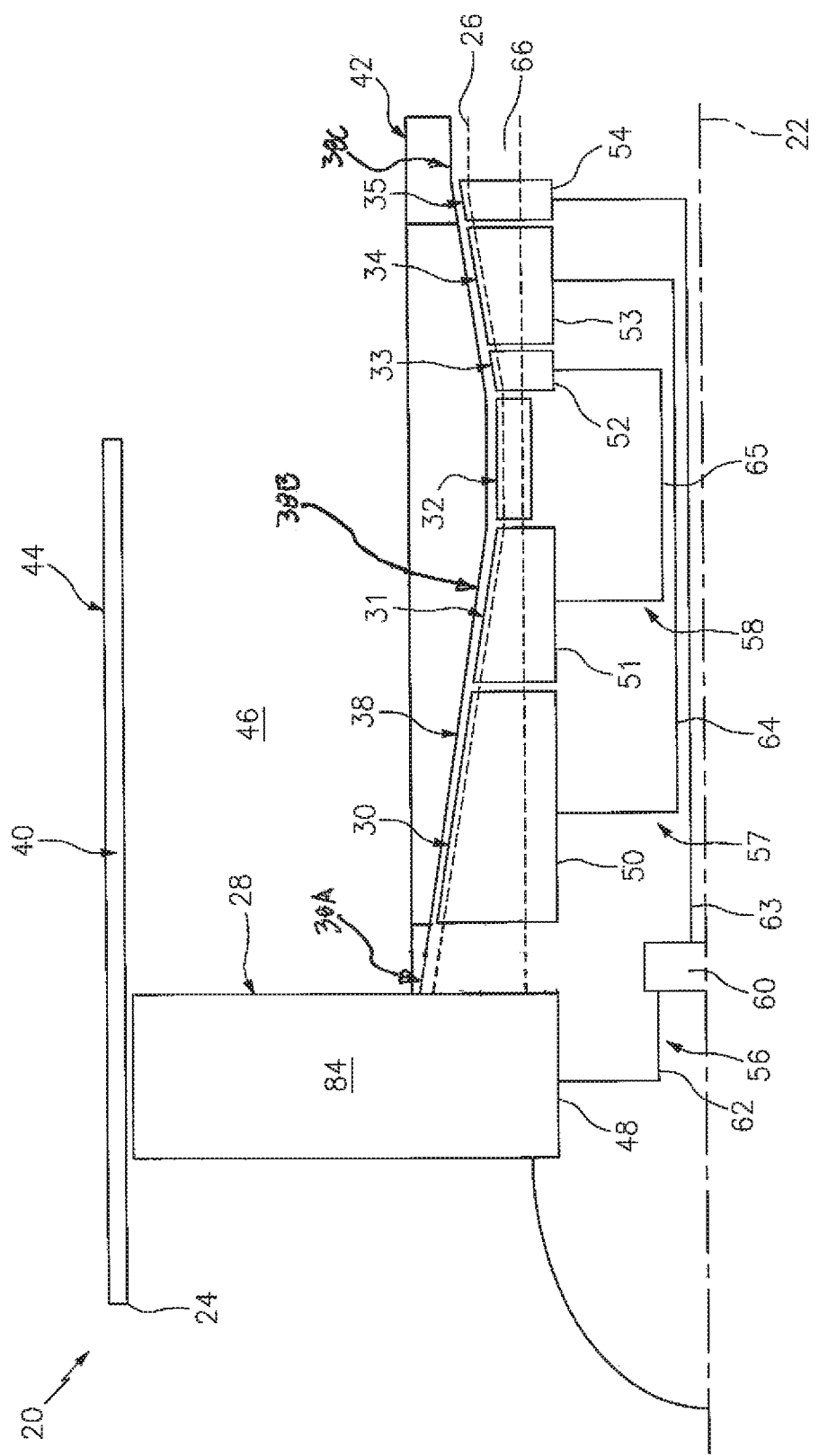
FIG. 10 is a partial schematic illustration of another example geared turbofan turbine engine.
Figure 11:
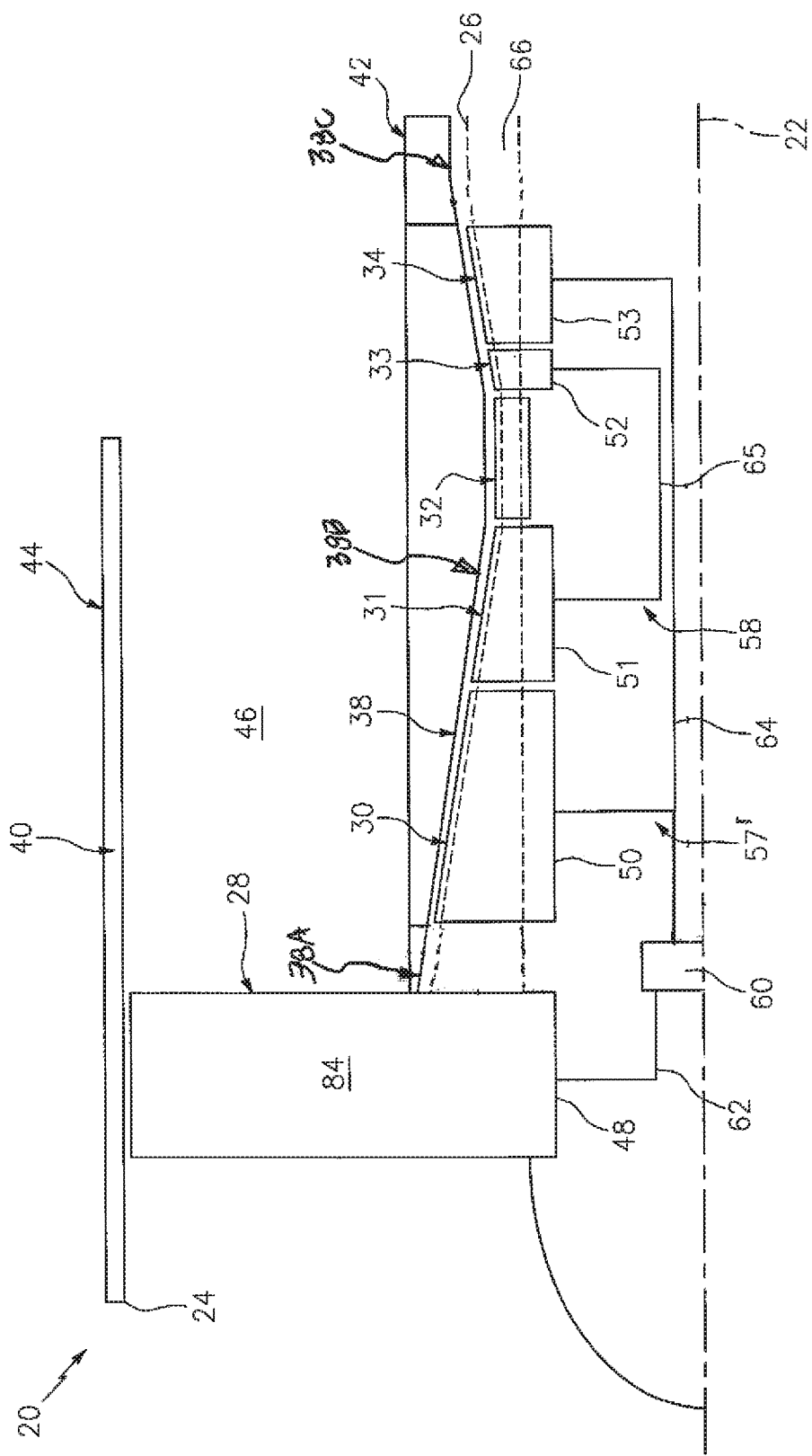
FIG. 11 is a partial schematic illustration of another example geared turbofan turbine engine.

In some embodiments, the turbine engine 20 may be configured without the LPC section 29 as illustrated in FIGS. 10 and 11. In such embodiments, the inner casing 38 may still include the first case structure 38A, which structure 38A may (or may not) have the same configuration as if the LPC section 29 was included. In the specific embodiment of FIG. 10, the first rotating assembly 56 is configured without the LPC rotor disk 49. In the specific embodiment of FIG. 11, the turbine engine 20 is configured with two rotating assemblies 57' and 58. The rotating assembly 57' is similar to the rotating assembly 57 described above, but also includes the fan rotor 48, the gear train 60 and the fan shaft 62.

Figure 12:
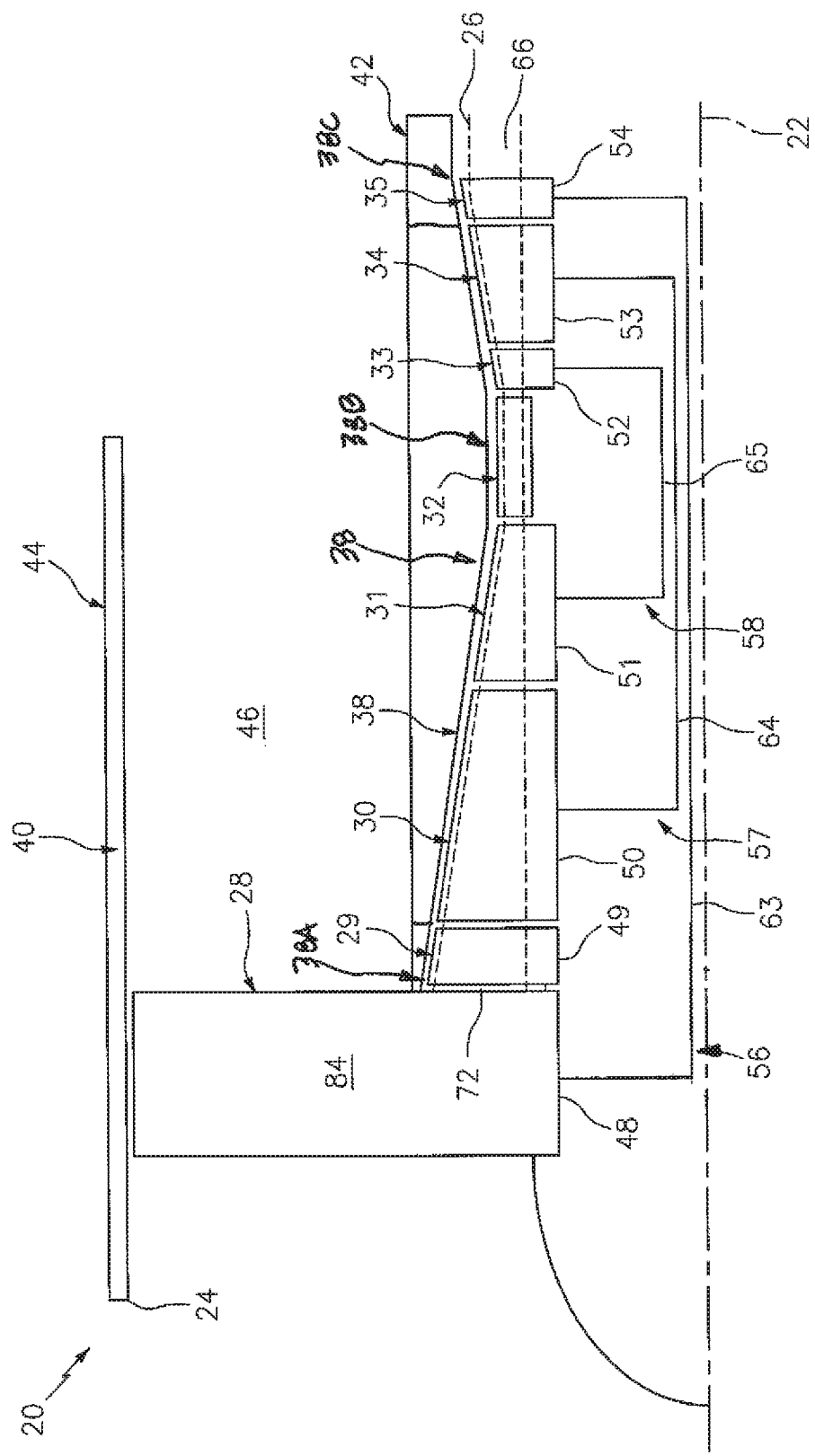
FIG. 12 is a partial schematic illustration of an example direct drive turbofan turbine engine.

In some embodiments, the turbine engine 20 may be configured as a direct drive turbine engine as illustrated in FIG. 12. The term "direct drive" may describe a turbine engine that does not include a gear train (e.g., the gear train 60 described above) and/or an engine where a fan rotor is connected to a turbine rotor in such a fashion that the fan rotor and the turbine rotor rotate at a common (the same) rotational speed. For example, the first rotating assembly 56 of FIG. 12 is configured without the gear train 60 or the fan shaft 62. Rather, the fan rotor 48 is connected (e.g., directly) to the low speed shaft 63 and, thus, the rotors 48, 49 and 54 are operable to rotate together at a common rotational speed.

Figure 13:
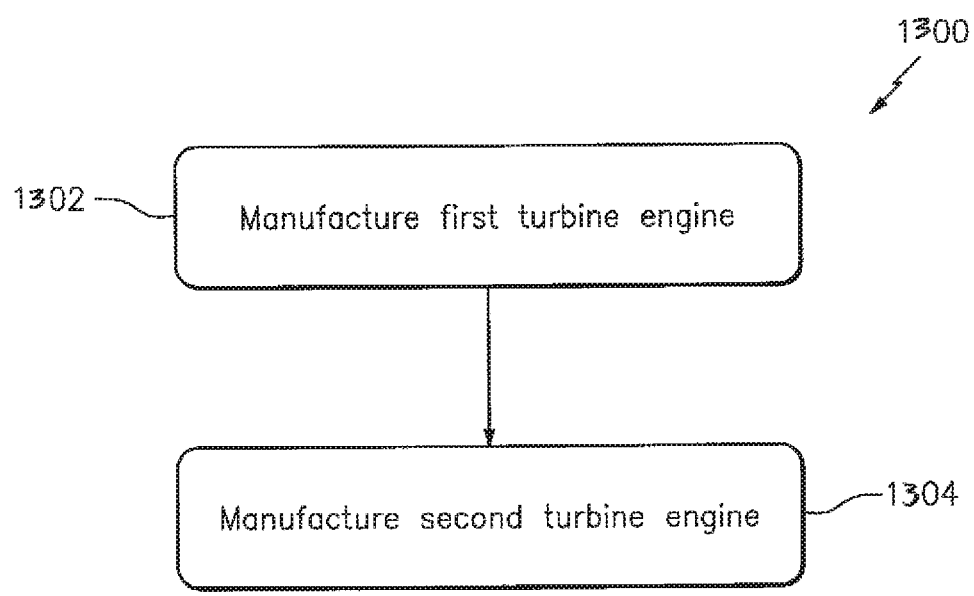
FIG. 13 is a flow diagram of a method for providing a plurality of turbine engines.

FIG. 13 is a flow diagram of a method 1300 for providing (e.g., assembling or otherwise manufacturing) a plurality of turbine engines. These turbine engines may be provided by a common entity; e.g., a manufacturer. The turbine engines may also or alternatively be provided for a common entity; e.g., a customer or end user. The turbine engines may still also or alternatively be provided generally contemporaneously, in common production run/cycle and/or during back-to-back production runs/cycles. The turbine engines may be assembled or otherwise manufactured in a common facility, or in different facilities.

In step 1302, a first turbine engine is provided; e.g., assembled or otherwise manufactured. In step 1304, a second turbine engine is provided; e.g., assembled or otherwise manufactured. The first turbine engine and/or the second turbine engine may each have a configuration generally similar to at least one of the turbine engine 20 embodiments described above. However, the first turbine engine may be configured for a first thrust rating whereas the second turbine engine may be configured for a second thrust rating that is different (e.g., lower) than the first thrust rating. For example, the first thrust rating may be 10× whereas the second thrust rating may be 7×. In some embodiments, the first and/or the second thrust ratings may each be 40,000 lbf or more; e.g., between 50,000 lbf and 120,000 lbf. Of course, the present disclosure is not limited to the foregoing exemplary thrust ratings. For example, in other embodiments, the first and/or the second thrust ratings may each be between 25,000 lbf and 50,000 lbf, or between 30,000 lbf and 65,000 lbf, or between 35,000 lbf and 85,000 lbf, etc.

The method 1300 of the present disclosure, however, is not limited to the foregoing exemplary thrust rating ratio. The method 1300 of the present disclosure is also not limited to providing engines with thrust ratings greater than 40,000 lbf. For example, one or both of the first and the second engines may have a thrust rating lower than or equal to 40,000 lbf.

The thrust ratings of the first and the second turbine engines may be dependent upon various parameters. These parameters may include, but are not limited to, the following:

Geometry (e.g., shape and size) of the fan blades (e.g., 84);
Number and diameter of the fan blades (e.g., 84);
Geometry of the compressor blades (e.g., 76, 80);
Number of the compressor blades (e.g., 76, 80);
Number of stages in the LPC section (e.g., 29);
Number of stages in the IPC section (e.g., 30);
Number of stages in the HPC section (e.g., 31);
Geometry of the turbine blades;
Number of the turbine blades;
Number of stages in the HPT section (e.g., 33);
Number of stages in the IPT section (e.g., 34);
Number of stages in the LPT section (e.g., 35);
Configuration of the gear train (e.g., 60); and/or
Configuration components (e.g., the combustor) in and operation of the core.

The first and the second turbine engines may each be configured for its specific thrust rating by changing any one or more of the foregoing parameters and/or one or more other parameters. However, if the first and the second turbine engines are each configured with (A) substantially similar cores (e.g., common case structures 38A, 38B and/or 38C, one or more common IPC, HPC, HPT, IPT rotor disks, one or more common shafts, etc.) and (B) one or more other parameters (e.g., geometry of LPC blades and/or fan blades, number of LPC stages, gear train gearing, inclusion or exclusion of a gear train, etc.) are changed to achieve the desired thrust ratings, then time and costs associated with engineering and/or manufacturing the first and the second turbine engines may be reduced. For example, if the first and the second turbine engines are configured with multi-spool cores having substantially similar configurations, then more than about fifty percent (50%) of the components included in the first turbine engine may be substantially similar to corresponding components in the second turbine engine. Thus, a single set of substantially common core components and/or other components may be engineered and manufactured for use in both the first and the second turbine engines. Examples of such common components may include, but are not limited to:

Any one or more of the case structures 38A-38B;
Any one or more of the engine shafts 64 and 65;
Any one or more of the rotor disks in any one or more of the sections 28-31 and 33-35;
The combustor 70 and/or any other combustor section 32 components such as, but not limited to, the fuel injector(s), the fuel manifold(s), etc.;
The engine lubrication system or one or more of its components; and
Peripheral/external components such as, but not limited to, wiring harness, control (e.g., ECM) box hardware, valves, etc.

This commonality in turn may reduce research and development time and costs as well as manufacturing time and costs.

The phrase "substantially similar" and "substantially common" is used herein to describe a set of components with generally or completely identical configurations; e.g., sizes (dimensions), geometries, number of rotor stages, etc. However, the components need not be completely identical. For example, in some embodiments, substantially similar/common components may be made of different materials and/or have different coatings. In some embodiments, substantially similar/common components such as the case structure 38A-C may include different accessory mounts and/or locate accessories at different positions. In some embodiments, substantially similar/common components may include different cooling passages, different seals, different cooling features (e.g., turbulators or fins), etc. Of course, in other embodiments, any of the "substantially similar" and "substantially common" components may alternatively be exactly the same/completely uniform in all parameters.

In some embodiments, the first and the second turbine engines may include substantially similar (e.g., multi-spool) cores as described above. For example, the inner case, or one or more of its structures (e.g., 38A, 38B and/or 38C), of the first turbine engine and the inner case, or one or more of its structures (e.g., 38A, 38B and/or 38C), of the second turbine engine may have substantially similar/common configurations. The combustor 70 of the first turbine engine and the combustor 70 of the second turbine engine may also or alternatively have substantially similar/common configurations. However, corresponding rotor blades in any one or more of the engine 20 sections may be slightly different. For example, an upstream-most set of compressor blades 100 (see FIG. 1) in the core of the first turbine engine may define a cross-sectional annular first area. An upstream-most set of compressor blades 100 in the core of the second turbine engine may define a cross-sectional annular second area which is slightly different than the first area. The second area, for example, may be within plus/minus twenty percent (+/−20%) of the first area.

In some embodiments, the first and the second turbine engines may include different number of stages in their respective LPC sections 29. For example, the first turbine engine may include a two-stage LPC section 29 whereas the second turbine engine may include a single stage LPC section 29. In other embodiments, the first and/or the second engines may each be configured without an LPC section.

In some embodiments, the first and the second turbine engines may each be configured as a geared (e.g., turbofan) turbine engine. In other embodiments, the first and the second turbine engines may each be configured as a direct drive (e.g., turbofan) turbine engine. In still other embodiments, the first turbine engine may be configured as a geared (e.g., turbofan) turbine engine, and the second turbine engine may be configured as a direct drive (e.g., turbofan) turbine engine.

In some embodiments, rotor (e.g., fan, compressor or turbine) blades in a stage of first turbine engine may have a common or different configuration as rotor blades in a corresponding stage of the second turbine engine. For example, fan blades in the first turbine engine may be the same as or different (e.g., in diameter and/or shape) than fan blades in the second turbine engine. In another example, first stage LPC blades in the first turbine engine may also or alternatively be the same as or different (e.g., in diameter and/or shape) than first stage LPC blades in the second turbine engine. In another example, first stage IPC blades in the first turbine engine may also or alternatively be the same as or different (e.g., in diameter and/or shape) than first stage IPC blades in the second turbine engine. In another example, first stage HPC blades in the first turbine engine may also or alternatively be the same as or different (e.g., in diameter and/or shape) than first stage HPC blades in the second turbine engine. In another example, first stage HPT blades in the first turbine engine may also or alternatively be the same as or different (e.g., in diameter and/or shape) than first stage HPT blades in the second turbine engine. In another example, first stage IPT blades in the first turbine engine may also or alternatively be the same as or different (e.g., in diameter and/or shape) than first stage IPT blades in the second turbine engine. In still another example, first stage LPT blades in the first turbine engine may also or alternatively be the same as or different (e.g., in diameter and/or shape) than first stage LPT blades in the second turbine engine.

In some embodiments, the first turbine engine and the second turbine engine may be configured with common nacelle configurations. In other embodiments, a nacelle configuration for the first turbine engine may be different than a nacelle configuration for the second turbine engine.

The first and the second turbine engines are described above with certain commonalities and certain differences. These commonalities and differences, however, may change depending upon the specific thrust rating requirements, customer requirements, government agency requirements, etc. The present disclosure therefore is not limited to the exemplary embodiments or the first and second turbine engine combinations described above. Furthermore, the method of FIG. 13 is not limited to providing two different turbine engines. For example, in other embodiments, the method of FIG. 13 may be performed to also provide a third turbine engine with a third thrust rating that is different from the first and the second thrust ratings, etc.

The present disclosure is not limited to the exemplary turbine engine 20 configurations described above. In some embodiments, for example, the core may include more than two rotating assemblies; e.g., three spools, four spools, etc. The core, for example, may include an additional intermediate compressor rotor and an additional intermediate turbine rotor connected together by an additional intermediate speed shaft. In some embodiments, the rotating assembly may include at least one additional compressor rotor where, for example, the LPC rotor 49 and the additional compressor rotor are arranged on opposite sides of the gear train 60. Furthermore, the present disclosure is not limited to a typical turbine engine configuration with the fan section 28 forward of the core (e.g., engine sections 30-35). In other embodiments, for example, the turbine engine 20 may be configured as a geared pusher fan engine or another type of gear turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method, comprising:
   manufacturing a first turbine engine configured with a first thrust rating, the first turbine engine comprising a first engine rotating assembly, a first engine fan rotor, a first engine turbine rotor and a first engine case structure housing at least the first engine rotating assembly, the first engine fan rotor connected to the first engine turbine rotor such that the first engine fan rotor and the first engine turbine rotor rotate at a common speed; and
   manufacturing a second turbine engine configured with a second thrust rating that is different than the first thrust rating, the second turbine engine comprising a second engine rotating assembly, a second engine fan rotor, a second engine turbine rotor, a second engine gear train and a second engine case structure housing at least the second engine rotating assembly, the second engine fan rotor connected to the second engine turbine rotor through the second engine gear train,
   wherein the first engine case structure and the second engine case structure have identical dimensions;
   wherein the first turbine engine and the second turbine engine are manufactured by a common entity;
   wherein the first engine rotating assembly comprises a first engine compressor rotor and a first engine turbine rotor; and
   wherein the second engine rotating assembly comprises a second engine compressor rotor and a second engine turbine rotor.

2. The method of claim 1, wherein
   the first turbine engine further comprises a first engine rotor upstream of the first engine case structure;
   the second turbine engine further comprises a second engine rotor upstream of the second engine case structure; and
   a configuration of the first engine rotor is different than a configuration of the second engine rotor.

3. The method of claim 2, wherein the first engine rotor and the second engine rotor are each configured as a compressor rotor.

4. The method of claim 1, wherein the manufacturing of the first turbine engine comprises assembling the first turbine engine, and the manufacturing of the second turbine engine comprises assembling the second turbine engine.

5. The method of claim 1, wherein the first engine case structure and the second engine case structure have identical geometries.

6. The method of claim 1, wherein
   the first turbine engine further comprises an additional first engine rotating assembly housed by the first engine case structure; and
   the second turbine engine further comprises an additional second engine rotating assembly housed by the second engine case structure.

7. The method of claim 1, wherein the first turbine engine consists of a first number of rotor disks, and the second turbine engine consists of a second number of rotor disks that is different than the first number of rotor disks.

8. The method of claim 1, wherein
   the first engine rotating assembly comprises a first engine rotor disk;
   the second engine rotating assembly comprises a second engine rotor disk; and
   the first engine rotor disk and the second engine rotor disk have common configurations.

9. The method of claim 1, wherein
the first engine rotating assembly comprises a first engine shaft;
the second engine rotating assembly comprises a second engine shaft; and
the first engine shaft and the second engine shaft have common configurations.

10. The method of claim 1, wherein
the first turbine engine comprises a first engine combustor;
the second turbine engine comprises a second engine combustor; and
the first engine combustor and the second engine combustor have common configurations.

\* \* \* \* \*